Nov. 18, 1958 C. E. MURCOTT 2,860,888
COLLAPSIBLE GOLF CARTS
Filed Oct. 4, 1954
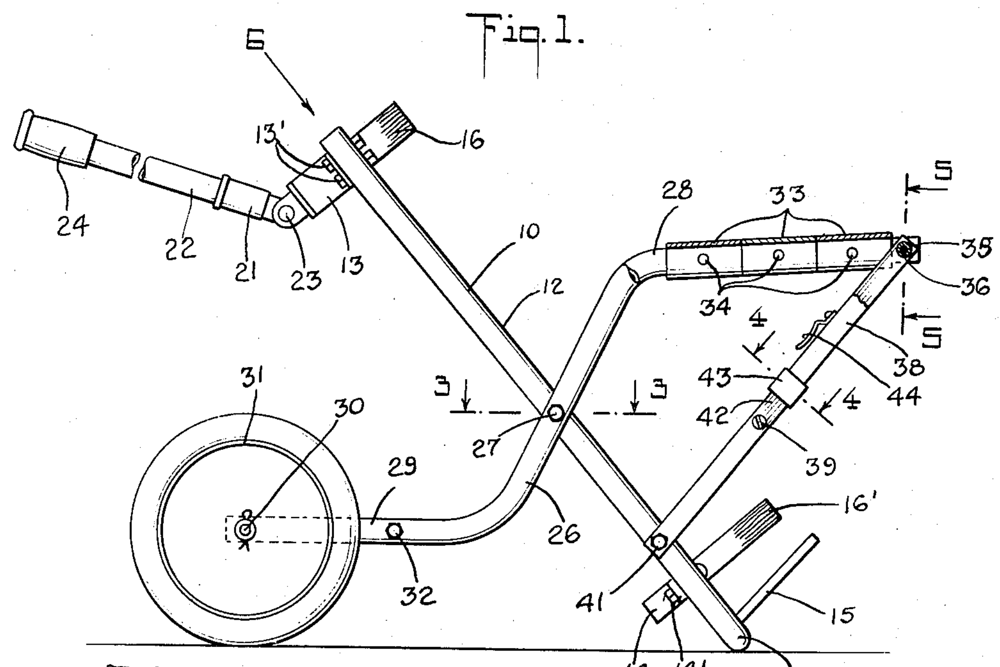
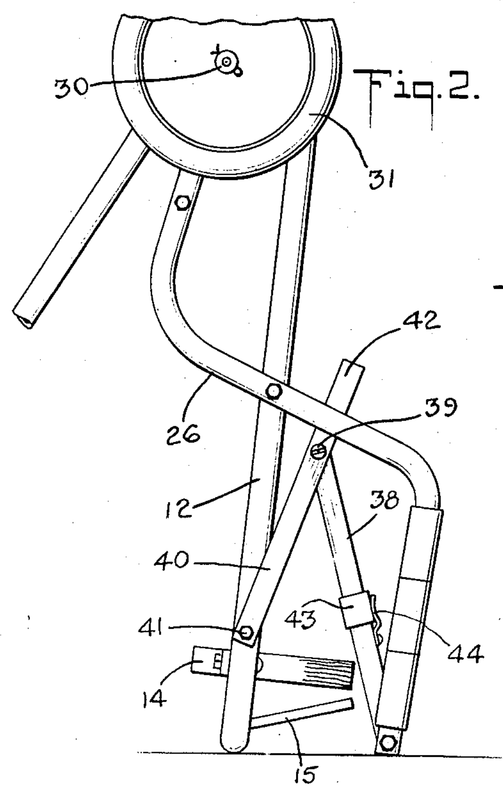
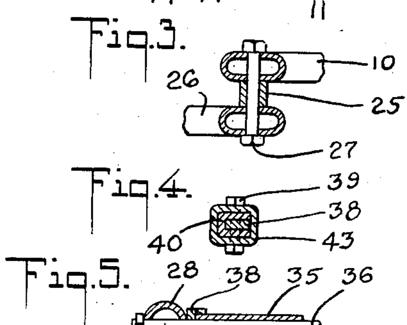
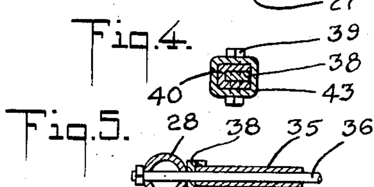
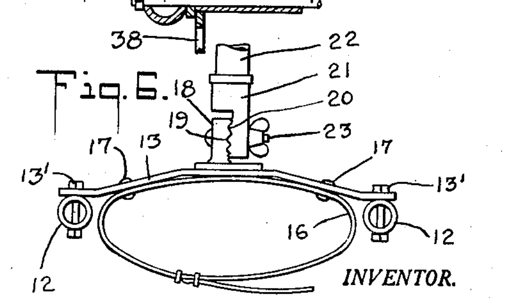
INVENTOR.
CHARLES E. MURCOTT
BY
Howard E. Thompson
ATTORNEY 2,860,888
Patented Nov. 18, 1958

2,860,888

COLLAPSIBLE GOLF CARTS

Charles E. Murcott, Valley Stream, N. Y.

Application October 4, 1954, Serial No. 459,963

2 Claims. (Cl. 280—41)

This invention relates to what are known as collapsible golf carts, that is to say, carts adapted for support of golf clubs in the operation of playing the game of golf. More particularly, the invention deals with a collapsible cart of the character described, including a seat which can be utilized by the player when the cart is in use.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of a cart made according to my invention in extended position, with parts of the construction broken away and in section.

Fig. 2 is a side view showing the cart in a partially collapsed position, with part of the construction broken away.

Fig. 3 is an enlarged section on the line 3—3 of Fig. 1.

Fig. 4 is an enlarged section on the line 4—4 of Fig. 1.

Fig. 5 is an enlarged section on the line 5—5 of Fig. 1; and

Fig. 6 is a view looking in the direction of the arrow 6 of Fig. 1.

The cart comprises a main U-shaped frame 10 of tubular construction, in other words, comprises a bottom crosshead 11 and upwardly extending side members 12. The side members, at the upper ends thereof, are joined by an offset crossframe 13, note Fig. 6 of the drawing, and a generally similar crossframe 14 joins the lower end portion of the side members 12. These crossframes brace the U-shaped frame and, at the same time, form back supports for a golf bag. The lower end of the golf bag rests upon an outwardly extending foot 15 fixed centrally to the crosshead 11 in any suitable manner. A pair of straps 16, 16' are riveted to the crossframes 13, 14 as, for example, by the rivets 17 in Fig. 6 of the drawing, and these straps are to securely hold the golf bag against displacement from the frame 10.

The upper crossframe 13 includes, centrally thereof, a rearwardly extending bearing 18 having a tooth surface 19 to adjustably engage a corresponding tooth surface 20 on a fitting 21 at the end of a tubular handle member 22 in adjustably securing the handle member and also support of the handle member in collapsed position. A winged nut bolt 23 is employed to adjustably clamp the handle member in different positions. The free end of the handle member preferably has a rubber handgrip, as noted at 24 in Fig. 1 of the drawing.

Pivoted to the side members 12 of the frame 10 and spaced with respect thereto by spacing collars 25, note Fig. 3, are side wheel supporting frame members 26, this pivotal coupling being formed by bolts 27, as noted in Fig. 3 of the drawing.

Each side frame member has substantially parallel offset seat supporting ends 28 and wheel supporting ends 29. The last named ends support an axle 30 bracing the ends of the end portions 29 and forming pivotal mounting for tired wheels 31. Between the axle and the pivots 27, the end portions 29 are further braced by crossrods 32. The end portions 28 and 29 are substantially of the same length and are equally offset with respect to pivot 27.

The seat end portions 28 of the side frames 26 have attached thereto, in the construction shown, three transverse fabric or plastic seat bands 33 suitably wrapped around the end portions 28. The bands 33 are fixed to the end portions 28 by suitable fasteners as seen at 34, in Fig. 1 of the drawing. The bands 33 are kept under tension and the end portions 28 of the side frames are held in definite spaced relationship by spacing sleeves 35 mounted on transverse brace rods 36, one end portion of one of these rods and part of one of the sleeves being shown in Fig. 5 of the drawing and it is preferred that washers 38' be disposed between the ends of the sleeves 35 and the end portions 28 of the side frames.

The washers further serve to keep brace rods 38 in spaced relationship to the bands 33 arranged upon the end portions 28, particularly when the parts are in the collapsed position, as partially seen in Fig. 2 of the drawing. The rods 38 are in the form of flat metal strips and are pivoted, as seen at 39, to similar rods 40, the latter being pivoted to the side members 12, as seen at 41.

The rods 40 have ends 42 extending beyond the pivots 39 to be arranged upon adjacent end portions of the rods 38 when the parts are in operative position, as shown in Fig. 1 of the drawing. The rods 40 are of channel cross-sectional form, as clearly noted in Fig. 4 of the drawing, and the rods 38 are pivoted within the channel.

Slidably mounted on the rods 38 are retaining collars 43 which are adapted to frictionally engage the rod ends 42, as noted in Fig. 1 of the drawing, in supporting the cart in extended position.

In collapsing the cart, the collars 43 are moved outwardly beyond the limits of the ends 42 and are retained in predetermined position by spring clips 44, as noted in Fig. 2 of the drawing.

It will be noted from a consideration of Fig. 1 of the drawing that the crossframe 13 is considerably wider than the crossframe 14 and is held in position by pairs of bolts 13'; whereas, single bolts 14' are used on the crossframe 14. The double bolt and wider frame structure gives stability to the upper portion of the main frame 10.

In the accompanying drawings, the showing in Fig. 1 is more or less diagrammatic, as in actual use, the main frame normally maintains a more perpendicular position than that shown, so as to provide a more upright backrest for the player when arranged upon the seat formed by the bands 33. At the same time, the open showing of Fig. 2 does not represent the fully collapsed position of the cart, as the cart, when fully collapsed, is very compact. The more open position has been illustrated for sake of clarity in the showing.

Having fully described my invention, what I claim as new and desire to secure by Letters Patent is:

1. The combination with a golf cart, comprising a main frame having a lower ground engaging end and upper parallel sides, with means for supporting golf clubs on said frame and including an adjustable handle member coupled with the upper sides of said frame, of a combination wheel and seat frame having a central portion pivotally mounted on said main frame, the pivotal mounting being substantially centrally of both of said frames, said wheel and seat frame having long offset substantially parallel wheel and seat supporting end portions, said end portion being of a length substantially equal to the length of the central portion and substantially equally offset with respect to said pivotal mounting, said end portions extending beyond the lower end and upper sides of the main frame when the cart is in use position, the wheel and seat portions of the wheel and seat frame extending outwardly of the central portion of said frame, and means extending between the ends of the seat supporting end portions and the lower end portion of the main frame for bracing the second named frame on the main frame in support of the frames in extended use position.

2. The combination with a golf cart, comprising a main frame having a lower ground engaging end and upper parallel sides, with means for supporting golf clubs on said frame and including an adjustable handle member coupled with the upper sides of said frame, of a combination wheel and seat frame having a central portion pivotally mounted on said main frame, the pivotal mounting being substantially centrally of both of said frames, said wheel and seat frame having long offset substantially parallel wheel and seat supporting end portions, said end portion being of a length substantially equal to the length of the central portion and substantially equally offset with respect to said pivotal mounting, said end portions extending beyond the lower end and upper sides of the main frame when the cart is in use position, the wheel and seat portion of the wheel and seat frame extending outwardly of the central portion of said frame, means extending between the ends of the seat supporting end portions and the lower end portion of the main frame for bracing the second named frame on the main frame in support of the frames in extended use position, and means including a spacing sleeve extending between ends of said seat supporting end portions for bracing and spacing said seat supporting end portions.

References Cited in the file of this patent

UNITED STATES PATENTS

| | | |
|---|---|---|
| 984,939 | Krile | Feb. 21, 1911 |
| 2,013,910 | Burst | Sept. 10, 1935 |
| 2,054,967 | Dahl | Sept. 22, 1936 |
| 2,063,242 | Graser | Dec. 8, 1936 |
| 2,438,078 | Sutphen | Mar. 16, 1948 |
| 2,670,216 | Leonard | Feb. 23, 1954 |
| 2,727,564 | Gruber | Dec. 20, 1955 |